United States Patent [19]

Nitta

[11] Patent Number: 5,691,931
[45] Date of Patent: Nov. 25, 1997

[54] LOW POWER ADDER FOR ACCUMULATION

[75] Inventor: Kenichi Nitta, Kodaira, Japan

[73] Assignee: Hitachi America, Ltd., Tarrytown, N.Y.

[21] Appl. No.: 481,048

[22] Filed: Jun. 7, 1995

[51] Int. Cl.$^6$ .................. G06F 7/50; G06F 1/00
[52] U.S. Cl. .......................... 364/768; 364/707
[58] Field of Search ................ 364/736, 750.5, 364/768, 770, 784, 786, 787, 788, 707

[56] References Cited

U.S. PATENT DOCUMENTS

| | | | |
|---|---|---|---|
| 4,731,797 | 3/1988 | Jaffé et al. | 375/292 |
| 4,951,237 | 8/1990 | Essenwanger | 364/721 |
| 5,375,079 | 12/1994 | Uramoto et al. | 364/736 |
| 5,497,341 | 3/1996 | Cohen | 364/786 |
| 5,504,698 | 4/1996 | Su | 364/768 |

OTHER PUBLICATIONS

Anantha P. Chandrakasan, Randy Allmon, Anthony Stratakos, Robert W. Brodersen, "Design of Portable Systems", IEEE 1994 Custom Integrated Circuits Conference, pp. 259–266.

*Primary Examiner*—Chuong D. Ngo
*Attorney, Agent, or Firm*—Flehr Hohbach Test Albritton & Herbert LLP

[57] ABSTRACT

A low power, adder-based circuit for accumulating small inputs is disclosed. Many applications running on large scale integrated circuits (LSIs) require small, two's complement inputs to be accumulated hundreds, or thousands, of times. Given the number of times such an accumulation is performed, it is essential that the LSI circuitry performing the accumulation operation is power efficient. It is also essential that the accumulator circuitry is compact and not overly complex to keep chip size and cost to a minimum. The present invention includes a input converter that shifts the inputs to be accumulated by a fixed positive amount, yielding a shifted input that is guaranteed to be a positive value. The adder then accumulates the positive shifted inputs. After all of the shifted inputs are accumulated, the adder adds a negative offset to the total to correct for the fixed positive mount added to each of the original inputs. The resulting circuit is power efficient because all of the values accumulated are positive, which minimizes the transition probability of bits manipulated by the adder. The resulting circuit also uses minimal chip real estate as it only needs one adder that performs both accumulation and offset correction.

10 Claims, 3 Drawing Sheets

1

LOW POWER ADDER FOR ACCUMULATION

The present invention relates generally to adders and particularly to adders used to accumulate small numbers.

BACKGROUND OF THE INVENTION

Large scale integrated circuits ("LSIs") are sometimes required to accumulate small, positive or negative numbers hundreds, or even thousands, of times. For example, one particular application might require inputs ranging from −7 to +7 to be accumulated 1024 times, resulting in an accumulated result between −7168 and +7168. To efficiently handle such tasks, many LSIs provide adder-based circuits, such as those shown in FIGS. 1a and 1b, that accumulate the inputs and maintain the accumulated result.

FIG. 1a shows a prior art, two's complement implementation of a small-input accumulator. This circuit consists of a 4-bit input buffer 110, a 14-bit two's complement adder 112, and two output buffers, one an intermediate output buffer 114, the other a results buffer 116.

As the first step in one accumulation cycle, the input buffer 110 receives one of the inputs 108 to be accumulated. Each of these inputs is a 4-bit two's complement number whose four bits i3–i0 represent the sign and numerical value of the input 108. The input buffer 110 then forms an addend 108' by sign extending the input 108 to the full width of the adder 112, i.e., the input buffer 110 sets bits i13–i4 of the addend 108' to the value of the MSB of the input 108. The adder 112 then receives the addend 108', adds it to the running total 118, outputs the 14-bit result of the addition to the intermediate output buffer 114, and reloads the adder's running total 118 with the contents of the intermediate output buffer 114. When all of the inputs 108 have been accumulated, the result can be read from the result buffer 116.

This procedure is computationally straight-forward but potentially quite power inefficient. This is because the inputs 108 being accumulated could be positive or negative. Thus, when positive addends 108' alternate with negative addends 108', the adder must repeatedly flip the addend's sign bits i13–i3 between 0 and 1. Every time a bit is flipped, power is dissipated in the LSI. Consequently, given the large number of times the inputs 108 are accumulated, this implementation has poor power consumption characteristics.

FIG. 1b shows another prior art accumulator circuit, which is a sign-magnitude implementation of a small-input accumulator. This circuit separately accumulates the negative inputs 108(−) and the positive inputs 108(+) and, only when all of the inputs have been accumulated (i.e., after 1024 cycles), subtracts the negative result from the positive result to yield the accumulated result. Consequently, this circuit includes positive and negative input buffers 124a, 124b; 13-bit adders 128a, 128b; intermediate output buffers 130a, 130b; and result buffers 132a, 132b. This prior art circuit also includes a select buffer 126 and a two's complement subtractor 134.

The circuit 100b initially receives inputs 108 to be accumulated in the select buffer 126. If the MSB, i3, of the input 108 is 0, indicating that the input is greater than or equal to 0, the least significant three bits, i2–i0, (the numerical bits) of the input 108 are loaded into the positive input buffer 124a. If the MSB of the input 108 is 1, meaning that the input is negative, the numerical bits are loaded into the negative input buffer 124b. The input buffers 124 zero-extend the received input 108 to the width (13-bits) of the adder 128 to form the addend 108'. The appropriate adder 128 then receives the addend 108' and accumulates the addend 108' into the positive or negative total 140a or 140b. Once all of the inputs 108 have been accumulated, unsigned numbers 142a and 142b representing positive and negative totals, respectively, are stored in the positive and negative result buffers 132a, 132b. The subtractor 134 then subtracts the negative result 142b from the positive result 142a, yielding the sum of all of the inputs.

This implementation 100b eliminates power consumption problems due to frequent bit flipping. That is, in the circuit 100b, the transition probability of the higher bits (e.g., bits i12–i2 of the addend 108') is lower than in the circuit 100a. This is apparent in power dissipation figures for the two circuits determined for random input values and 5 volt power supplies: 3.42 mW and 2.51 nW for the circuits 100a and 100b, respectively. Moreover, the 13-bit binary adders 128 are simpler than the 14-bit, two's complement adder 112 of the circuit 100a because the adders 128 only require incrementors for the higher order bits. However, the circuit 100b is, overall, more complex than the circuit 100a as it requires one additional two's complement subtractor, one additional 3-bit adder with 10-bit incrementor, and several additional registers. Consequently, while the implementation 100b is more power efficient than the circuit 100a, it is less space efficient, requires more transistors, and therefore is more expensive to build.

Thus, there is a need for a low-power adder circuit that can accumulate thousands of two's complement inputs while minimizing the transition probability of the higher order bits of the various inputs and the accumulating sum. Additionally, there is a need for a low-power accumulator that has a compact implementation that uses minimal chip real estate.

SUMMARY OF THE INVENTION

In summary, the present invention is a compact, low power accumulator circuit that meets the needs set out above. More specifically, the present invention is a low-power method for accumulating R, K-bit, two's complement binary input numbers, R being an integer $\leq 2^L$, where L is a predetermined integer value, the accumulating producing a N-bit, two's complement sum, wherein the most significant bit (MSB) of the K-bit input numbers is a sign bit and N is a predetermined value no smaller than K+L, the method comprising the steps of:

receiving the input numbers one by one;

adding a K-bit binary offset equaling $2^{K-1}$ to each of the input numbers to generate corresponding K-bit, positive input numbers;

accumulating the positive input numbers one by one into a positive sum; and subtracting a two's complement offset equaling $R*2^{K-1}$ from the positive sum to produce the N-bit two's complement sum; the N-bit two's complement sum being identical to the sum of the R, K-bit, two's complement input numbers.

The present invention is also a low-power circuit for accumulating R, K-bit, two's complement binary input numbers, R being an integer $\leq 2^L$, where L is a predetermined integer value, the accumulating producing a N-bit, two's complement sum of the K-bit, two's complement numerical inputs, wherein the most significant bit (MSB) of the numerical inputs is a sign bit and N is a predetermined value no smaller than K+L, the apparatus comprising:

An input converter that receives the two's complement inputs one by one and adds a K-bit binary offset equaling $2^{K-1}$ to each of the input numbers to generate corresponding K-bit, positive numerical inputs;

A two's complement adder with a first input coupled to the input converter's output and a second input coupled to a negative offset line providing a two's complement, N-bit negative offset value equaling $-R*2^{K-1}$;

such that the adder accumulates the positive inputs one by one into a N-bit, positive sum and then adds the N-bit, negative offset value to the positive sum to produce the N-bit two's complement sum; the N-bit two's complement sum being identical to the sum of the R, K-bit, two's complement input numbers.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 2:
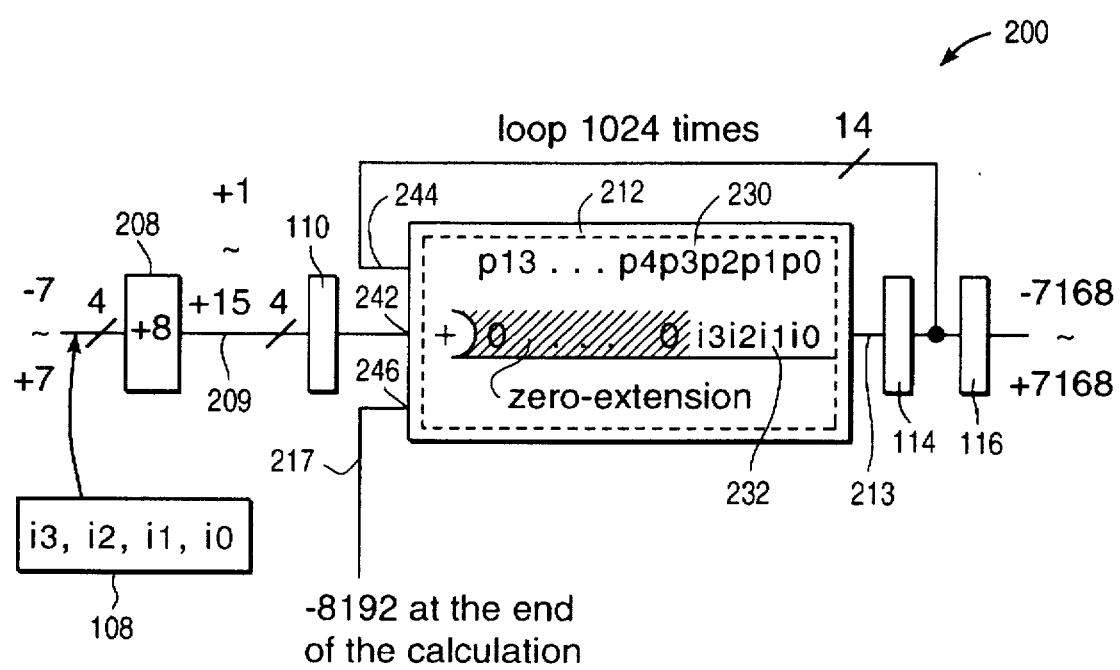
FIG. 2 is a circuit diagram of the accumulator of the present invention.

Referring to FIG. 2, there is shown a preferred adder circuit 200 of the present invention. This preferred embodiment is directed to the example set out above, wherein two's complement values between −7 and +7 are accumulated 1024 times. However, the present invention is equally applicable to the accumulation of two's complement inputs of any number of bits and over any number (R) of accumulation cycles.

Figure 1A:
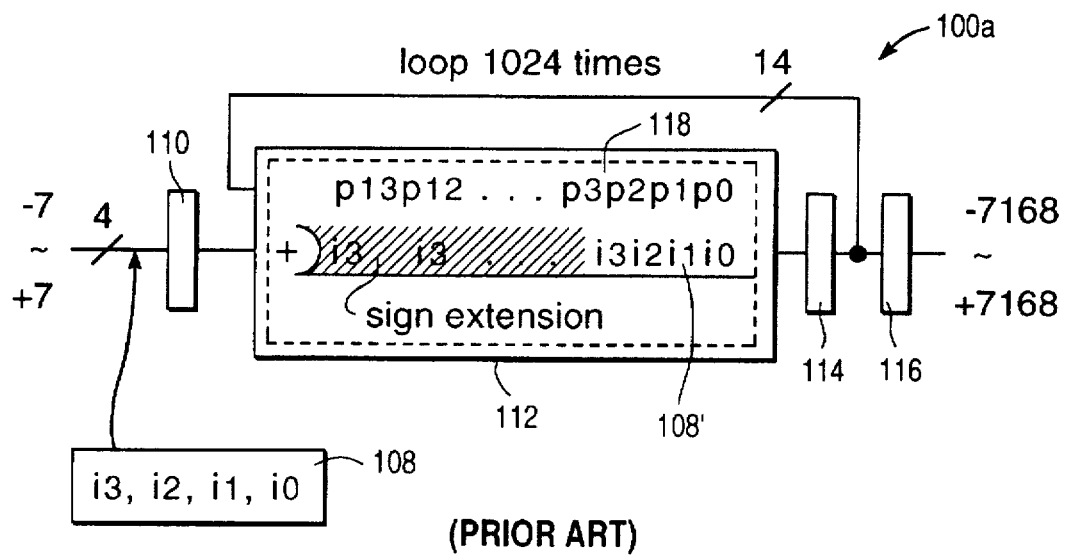
FIG. 1a is a circuit diagram of a prior art two's complement implementation of an accumulator.

The circuit 200 includes an input converter 208, an input buffer 110, a 14-bit binary adder 212, an output buffer 114 and a results buffer 116. Of these elements, the input buffer 110, the output buffer 114 and the results buffer 116 are well-known from the prior art and perform the same functions as described above in reference to FIG. 1a. Thus, the following discussion is directed to the input converter 208, the binary adder 212 and the low-power accumulation method of the present method.

Input Converter

The input converter 208 receives a 4-bit, two's complement input 108, shifts the input 108 by +8 (i.e., adds an offset of 8 to the input) and outputs a corresponding 4-bit, shifted input 209 to the input register 110, which stores the shifted input 209. Thus, given inputs 108 between −7 and +7, the converter 208 generates corresponding shifted inputs 209 between +1 to +15. These corresponding inputs are shown in Table 1, whose first and second columns list the decimal and two's complement representations of the possible inputs 108, and whose third and fourth columns list the corresponding decimal and two's complement representations of the shifted inputs 209. Note that in every instance, the two's complement representation of the shifted input 209 can be obtained by simply negating the MSB of the two's complement representation of the input 108, e.g., the shifted version of decimal −1 (1111) is decimal +7 (0111). Thus, the preferred embodiment of the converter 208 generates the 4-bit, shifted outputs 209 by negating the MSB of the 4-bit two's complement inputs 208. However, many other, less efficient implementations of this could also be used, including table look up and arithmetic methods.

TABLE 1

| Int | Two's complement | Int + 8 | Positive Num |
|---|---|---|---|
| 7 | 0111 | 15 | 1111 |
| 6 | 0110 | 14 | 1110 |
| . | . | . | . |
| . | . | . | . |
| . | . | . | . |
| 1 | 0001 | 9 | 1001 |
| 0 | 0000 | 8 | 1000 |
| −1 | 1111 | 7 | 0111 |
| . | . | . | . |
| . | . | . | . |
| . | . | . | . |
| −7 | 1001 | 1 | 0001 |
| −8 | 1000 | 0 | 0000 |

Adder

The adder 212 is a 14-bit, two's complement adder with a first input 242 coupled to the output of the intermediate output register 114, a second input 244 coupled to the input register 110 and a third input 246 coupled to a negative offset input line 217. Generally, the adder 212 receives first and second addends 230, 232 from these various sources, adds the two addends to form a sum 213, and outputs the sum 213 to the intermediate output register 114, which stores and provides the sum 213 to the results register 116. The source of the addends 230, 232 depends on the adder's operational mode, which can be selected from accumulation, reset, and offset correction.

When functioning as an accumulator, the adder 212 maintains the first addend 230 as a 14-bit running sum to which it periodically adds a 14-bit, second addend 232. The second addend 232 is formed by the input buffer 110 as a zero-extended version of the 4-bit, positive, shifted input 209 and is received by the adder at the second adder input 244. Because all of the shifted inputs 209 are positive, the transition probability of the high-order bits of the adder 212 is significantly reduced relative to the prior art accumulator circuit 100a of FIG. 1a. Thus, the adder circuit 200 of the present invention provides low power accumulation of small input values.

The adder 212 outputs the resulting sum 213 to the intermediate output buffer 114, which stores the sum. The stored version of the resulting sum 213 is then fed back from the intermediate output buffer 114 to the first input 242 of the adder 212, which, assuming there is at least one more shifted input 209 to be accumulated, will add the latest running sum 213 as the first addend 230 and the next shifted input 209 as the second addend 232. In this way, the adder 212 always maintains an updated version of the accumulating sum 230 even though the adder 212 is a combinational logic circuit without internal storage capabilities.

When in reset mode, the adder 212 does not load the running sum 230 with the resulting sum 213 from the last accumulation cycle. Instead, the adder 212 zeros out the running sum 230. Thus, in the next accumulation cycle, the resulting sum 213 simply equals the value of the first shifted input 209. In the preferred embodiment, this adder mode is only used at the very beginning of an accumulation operation.

When all 1024 of the inputs have been accumulated, the adder 212 enters the offset correction mode. At this point, the running sum 213 stored in the intermediate output register 114 equals the sum of all of the shifted inputs 209. Of course, this sum 213 is larger than the total of the inputs 108 to be accumulated. Thus, to provide the correct accumulated result, the adder provides an offset correction mode wherein the adder subtracts an appropriate, negative offset 217 from the running sum 213. In offset correction mode, this negative offset is received at the adder input 246 and is loaded by the adder as the second addend 232. The sum 213 is loaded into the adder 212 as the first addend 230. The resulting sum 213 is the difference of the sum 213 and the negative offset 217.

The magnitude of the negative offset 217 is determined by two factors: (1) the amount by which the input converter 208 shifted each of the inputs 209, and (2) the number of times the shifted inputs were accumulated. For example, in the case of the preferred embodiment 200, each of the inputs 208 is shifted by +8 ($2^3$) and the shifted inputs are accumulated 1024 ($2^{10}$) times. Consequently the running total 230 of the converted inputs 109 will always exceed the total sum of the inputs 108 by 8192 ($2^3 \times 2^{10}$). Thus, to yield the correct accumulated total, the preferred embodiment adds −8192 to the running total. Of course, when K-bit, shifted inputs 209 are accumulated $2^L$ times into a K+L bit total, that accumulated total is easily corrected without arithmetic calculations by simply negating the total's MSB (i.e., bit K+L). E.g., in the situation described above, assuming an accumulated total of 0800 hexadecimal (which is equivalent to 2048 decimal), negating bit 14 (i.e., p13) of the sum 230 yields a corrected value of hexadecimal $2800_{16}$ (decimal −6144), which is the difference of 2048 (the total) and −8192 (the offset). More generally, if the shifted inputs are accumulated R times, where R can be any positive number, the negative offset equals $-R*2^{K-1}$. In this general case, the adder 212 actually subtracts the negative offset 217 from the accumulated result. This correction method also explains why the adder 212 of the preferred embodiment is a 14-bit adder rather than a 15-bit adder.

The largest possible running sum 230 maintained by the adder 212 is 15 ($2^4-1$)×1024 ($2^{10}$), or 15,360. The smallest possible running sum 230 is 1024. This range of values can be expressed with 14 bits. Therefore, one might expect that, to accommodate the two's complement math needed to add the the negative offset 217 to the running sum 130, the adder needs an extra (sign) bit. However, in the case set out above, the negative offset 217 (−8192), which equals $-2^{10+4-1}$, can be represented in 14 bits. Thus, the adder 212 need only be a 14-bit adder. An additional, 15th, bit in the adder 212 would only be necessary if a positive offset equal to $2^{13}$ were added to the running sum 230.

More generally, the minimum number of bits supported by the adder 212 of the present can be determined by the following equation:

minimum adder bits=L+K, where K is the number of bits needed to represent the shifted inputs 209 and $2^L$ is the power of 2 that is closest to and no smaller than the number of times (R) the shifted inputs are accumulated. For example, in the preferred embodiment of FIG. 2, K is 4 and L is 10, showing that the adder 212 must, at a minimum, support two's complement addition with 14-bit arguments. Thus, the number of bits in the adder 212 need be no larger than the number of bits (N) in the accumulated sum of the inputs, which generally is equal to L+K.

Figure 1B:
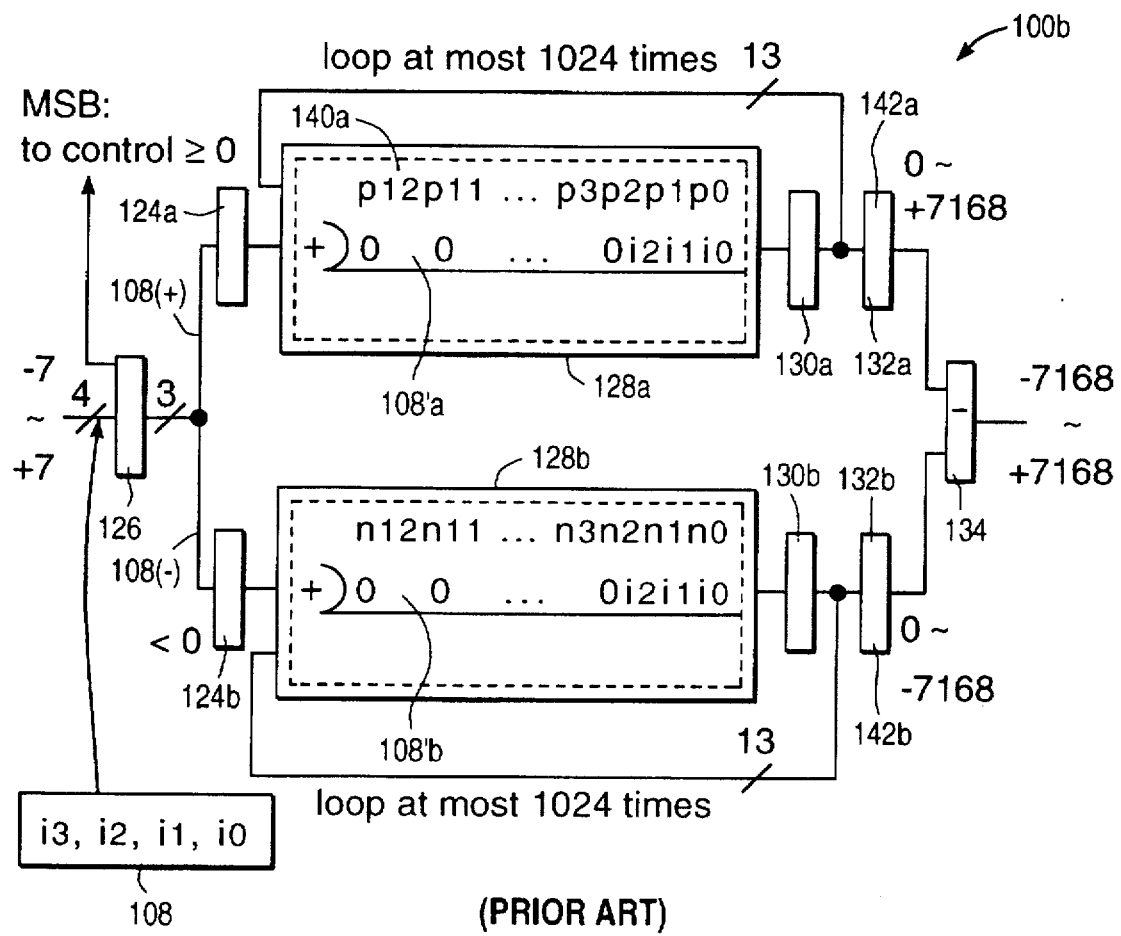
FIG. 1b is a circuit diagram of a prior art sign-magnitude implementation of an accumulator circuit.

By providing a single, two's complement adder with accumulation and error-correction modes and an input converter 208, the present invention is able to provide an accumulator implementation that is power-efficient and compact. For example, compare the present low power small input accumulation circuit 200 to the prior art implementation shown in FIG. 1b. The circuit 100b requires three adders and seven registers to perform low-power accumulation. In contrast, the present implementation needs only one two's complement adder and three registers. Thus, the present circuit is a low power design for accumulating small inputs thousands of times that requires minimal circuitry.

Accumulation Method

Figure 3:
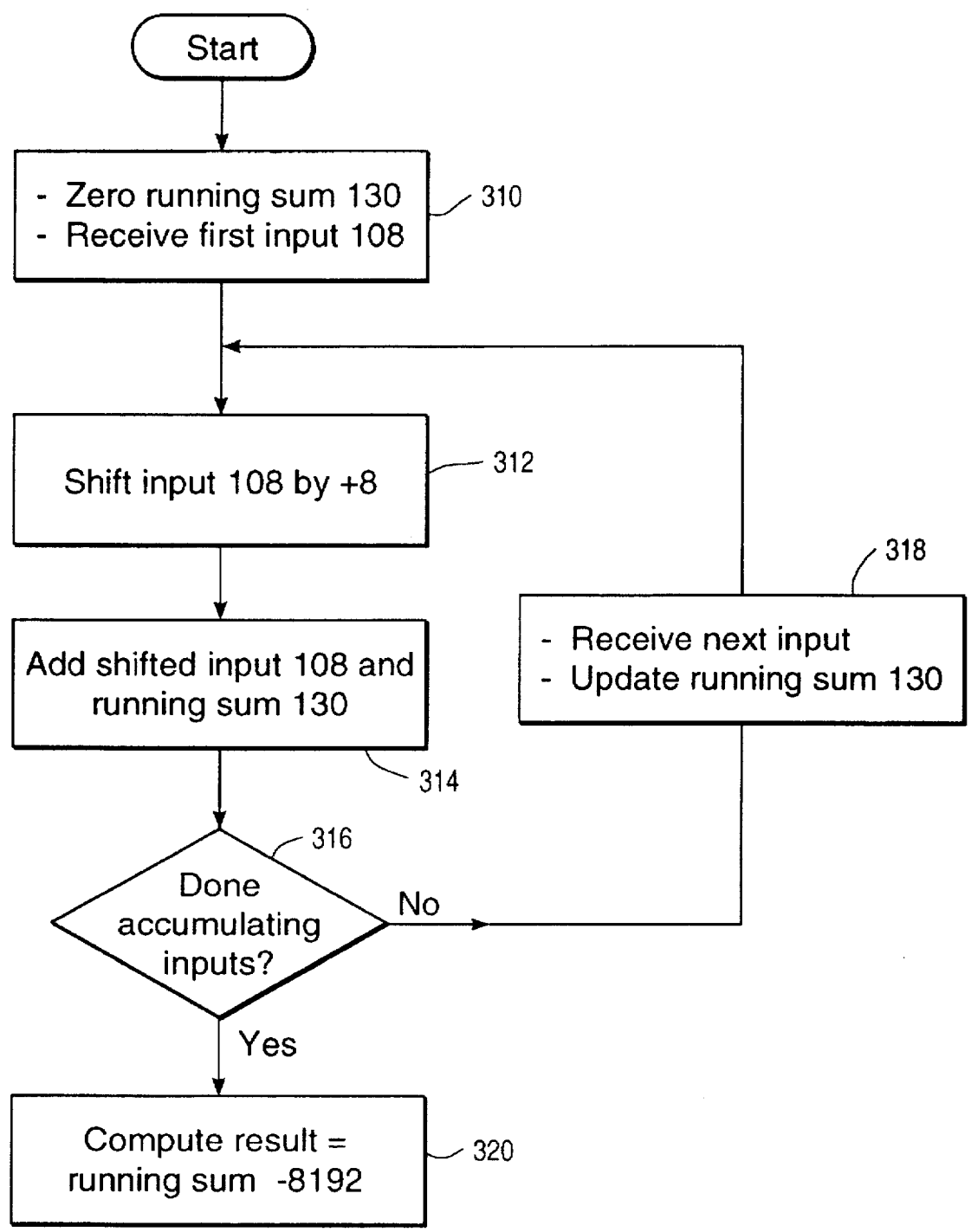
FIG. 3 is a flowchart of the accumulation process of the present invention.

Having set out in detail the elements of the present invention embodied in the circuit 200, all that remains is to briefly summarize the process by which the present invention employs these elements to accumulate the inputs 108. The steps of this method are presented in FIG. 3. In this discussion, reference numbers to process steps are included in parentheses.

As the first step of an accumulation operation, the running sum 230 maintained by the adder 212 is initialized to zero and the converter 208 receives the first input to be accumulated 108 (310). The converter 208 generates a corresponding shifted input 209 by shifting the input 108 by 8 (312). The input buffer 110 then forms the second addend 232 by zero-extending the shifted input 209 to 14 bits and the adder adds the second addend 232 to the running sum 230, forming a resulting sum 213 (314). The accumulator 200 then determines whether all of the inputs 108 have been accumulated (316). If all of the inputs have not been accumulated (316–N), the converter 208 receives the next input (318), the adder 212 loads the first addend with the current resulting sum 213 (318) and the process steps are repeated from step 312. If all of the inputs 108 have been accumulated (316–Y), the adder 212 loads the negative offset (i.e., −8192) as the second addend 232, and adds the second addend 232 to the current running sum 230 (320), which results in a resulting sum 213 that is the sum of all of the accumulated inputs 108.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A low-power method for accumulating for use in an integrated circuit performing an accumulate operation on R, K-bit, two's complement binary input numbers, R being an integer $\leq 2^L$, where L is a predetermined integer value, said accumulate operation producing a N-bit, two's complement sum, wherein the most significant bit (MSB) of said K-bit input numbers is a sign bit and N is a second predetermined integer value no smaller than K+L, said method comprising the steps of:

receiving said input numbers one by one;

adding a K-bit binary offset equaling $2^{K-1}$ to each of said input numbers to generate corresponding K-bit, positive input numbers;

accumulating said positive input numbers one by one into a positive sum; and subtracting a two's complement offset equaling $R*2^{K-1}$ from said positive sum to produce said N-bit two's complement sum; said N-bit two's complement sum being identical to the sum of said R, K-bit, two's complement input numbers, the adding step minimizing the transition probability of higher order bits of the positive sum as said positive sum is accumulated, causing said integrated circuit to use less power to accumulate said 2's complement input numbers than when said integrated circuit directly accumulates said 2's complement input numbers without said adding step.

2. A low-power method for accumulating for use in an integrated circuit performing an accumulate operation on R, K-bit, two's complement binary input numbers, R being an integer $\leq 2^L$, where L is a predetermined integer value, said accumulate operation producing a N-bit, two's complement sum, wherein the most significant bit (MSB) of said K-bit input numbers is a sign bit and N is a second predetermined integer value no smaller than K+L, said method comprising the steps of:

receiving said input numbers one by one;

adding a K-bit binary offset equaling $2^{K-1}$ to each of said input numbers to generate corresponding K-bit, positive input numbers;

accumulating said positive input numbers one by one into an N-bit, positive sum; and subtracting an N-bit, two's complement offset equaling $R*2^{K-1}$ from said N-bit positive sum to produce said N-bit, two's complement sum; said N-bit two's complement sum being identical to the sum of said R, K-bit, two's complement input numbers, the adding step minimizing the transition probability of higher order bits of the positive sum as said positive sum is accumulated, causing said integrated circuit to use less power to accumulate said 2's complement input numbers than when said integrated circuit directly accumulates said 2's complement input numbers without said adding step.

3. The method of claim 2, further comprising the step of:

before accumulating said positive input numbers, zero-extending said K-bit, positive input numbers to produce N-bit, positive input numbers;

wherein said adding step comprises negating said MSB of said two's complement input numbers and said positive input numbers accumulated into said N-bit positive sum are said N-bit positive input numbers.

4. The method of claim 2, wherein K is 4, L is no larger than 10 and N is 14.

5. The method of claim 2, wherein, when $R=2^L$ and $N=K+L$, said subtracting step comprises negating bit K+L of said positive sum.

6. For use in an integrated circuit, a low-power circuit for accumulating R, K-bit, two's complement binary input numbers, R being an integer $\leq 2^L$, where L is a predetermined integer value, said accumulating producing a N-bit, two's complement sum of said K-bit, two's complement numerical inputs, wherein the most significant bit (MSB) of said numerical inputs is a sign bit and N is a second predetermined integer value no smaller than K+L, said circuit comprising:

An input converter that receives said two's complement inputs one by one and adds a K-bit binary offset equaling $2^{K-1}$ to each of said input numbers to generate corresponding K-bit, positive numerical inputs;

A two's complement adder with a first input coupled to said input converter's output and a second input coupled to a negative offset line providing a two's complement, N-bit negative offset value equaling $-R*2^{K-1}$;

said adder accumulating said positive inputs one by one into a N-bit, positive sum and then, following accumulation of said R positive inputs, adding said N-bit, negative offset value to said positive sum to produce said N-bit two's complement sum; said N-bit two's complement sum being identical to the sum of said R, K-bit, two's complement input numbers, such that the input converter's addition of the K-bit binary offset minimizes the transition probability of higher order bits of said positive sum accumulated by said adder, causing said integrated circuit to use less power when accumulating said 2's complement input numbers than integrated circuits that directly accumulate said 2's complement input numbers without the input conversion.

7. The circuit of claim 6, wherein:

said input converter generates said K-bit positive input numbers by negating said MSB of said two's complement input numbers, and before accumulating each of said positive inputs said adder zero-extends said K-bit, positive inputs to produce N-bit, positive inputs, said N-bit positive inputs being said positive inputs accumulated into said N-bit positive sum.

8. The circuit of claim 6, wherein said adder is a N-bit two's complement adder.

9. The circuit of claim 6, wherein K is 4, L is no larger than 10 and N is 14.

10. The circuit of claim 6, wherein, when $R=2^L$ and $N=K+L$, said adder adds said negative offset to said positive sum by negating bit K+L of said positive sum.

* * * * *